(12) United States Patent
Lin

(10) Patent No.: US 10,134,543 B2
(45) Date of Patent: Nov. 20, 2018

(54) LUMINOUS KEYBOARD

(71) Applicant: Primax Electronics Ltd., Taipei (TW)

(72) Inventor: Hui-Ling Lin, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 15/701,629

(22) Filed: Sep. 12, 2017

(65) Prior Publication Data

US 2018/0301299 A1   Oct. 18, 2018

(30) Foreign Application Priority Data

Apr. 14, 2017  (TW) .............................. 106112590 A

(51) Int. Cl.

| H01H 13/83 | (2006.01) |
|---|---|
| G06F 3/02 | (2006.01) |
| H01H 13/70 | (2006.01) |
| F21V 8/00 | (2006.01) |

(52) U.S. Cl.
CPC ............ *H01H 13/83* (2013.01); *G02B 6/0031* (2013.01); *G06F 3/0202* (2013.01); *H01H 13/70* (2013.01)

(58) Field of Classification Search
CPC ...... H01H 13/83; H01H 13/70; H01H 13/023; H01H 15/025; H01H 2221/07; H01H 2219/062; H01H 2219/044; H01H 2219/06; H01H 2219/054; H01H 2219/056; H01H 9/161; H04M 1/22; G06F 3/0202; G06F 3/02
See application file for complete search history.

(56) References Cited

U.S. PATENT DOCUMENTS

| 9,875,864 | B2* | 1/2018 | Chih ...................... H01H 13/83 |
| 2014/0118989 | A1* | 5/2014 | Chen ...................... H01H 13/83 |
| | | | 362/607 |
| 2016/0109636 | A1* | 4/2016 | Weng .................. H01H 13/023 |
| | | | 362/23.03 |
| 2016/0284488 | A1* | 9/2016 | Zhang ................. H01H 13/023 |

* cited by examiner

*Primary Examiner* — Y M Lee
(74) *Attorney, Agent, or Firm* — Kirton McConkie; Evan R. Witt

(57) ABSTRACT

A luminous keyboard includes plural keys and a backlight module under the plural keys. The backlight module includes a light-shading plate, a light guide plate and a reflecting plate, which are sequentially stacked on each other from top to bottom. The light-shading plate includes a first cutting hole and a first cutting hole periphery around the first cutting hole. The light guide plate includes a perforation. The reflecting plate includes a second cutting hole and a second cutting hole periphery around the second cutting hole. A top surface of the second cutting hole periphery is attached on a bottom surface of the first cutting hole periphery through the perforation. While an object is penetrated through the first cutting hole and the second cutting hole, the object is closely covered by the first cutting hole periphery and the second cutting hole periphery in response to an elastic restoring force.

18 Claims, 6 Drawing Sheets

LUMINOUS KEYBOARD

FIELD OF THE INVENTION

The present invention relates to a luminous keyboard, and more particularly to a luminous keyboard capable of avoiding light leakage.

BACKGROUND OF THE INVENTION

As known, keyboards are indispensable input devices for people in the modern societies to operate computers. Generally, plural keys are installed on a top surface of the keyboard. Via the keyboard, the user can press one or more keys to input a command.

With increasing development of keyboards, a keyboard with a backlight module has been prevailing in the market. The keyboard with the backlight module is also referred as a luminous keyboard. When the luminous keyboard is used in an indoor lighting environment such as an office or a room, the human eyes can obviously recognize that the light beam from a bottom side of the luminous keyboard illuminates all keys of the luminous keyboard. Consequently, a visual effect is generated.

Generally, the backlight module comprises a light-shading plate, a light guide plate and a reflecting plate. The light guide plate is clamped between the light-shading plate and the reflecting plate. Consequently, the light beam is restrainedly transmitted within the light guide plate and outputted from specified light-outputting zones. Moreover, due to the arrangements of cables or inner structures of the keyboard, some openings are formed in specified positions of the backlight module. The cables or the inner structures are penetrated through the corresponding openings. However, since the cable or the inner structure is usually thinner than the opening, the opening cannot be completely shaded by the volume of the cable or the inner structure. The light beam is possibly leaked out from the positions of the backlight module corresponding to the openings.

Therefore, the conventional luminous keyboard needs to be further improved.

SUMMARY OF THE INVENTION

The present invention provides a luminous keyboard. A backlight module is made of a flexible material. A cutting hole is formed in the backlight module for allowing an object to pass through. When the object is penetrated through the cutting hole, the outer surface of the object is closely covered by the periphery of the cutting hole in response to the elastic restoring force of the backlight module. Consequently, the light utilization is not reduced.

In accordance with an aspect of the present invention, there is provided a luminous keyboard. The luminous keyboard includes plural keys, a membrane circuit board and a backlight module. The membrane circuit board is located under the plural keys, and includes plural electrical contacts. The plural keys are aligned with the plural electrical contacts, respectively. When one of the plural keys is pressed by a user, the corresponding electrical contact is triggered. The backlight module is located under the membrane circuit board, and includes a light-shading plate, a light guide plate and a reflecting plate. The light-shading plate, the light guide plate and the reflecting plate are sequentially stacked on each other from top to bottom. The light-shading plate includes a first cutting hole and at least one first cutting hole periphery around the first cutting hole. The light guide plate includes a perforation. The reflecting plate includes a second cutting hole and at least one second cutting hole periphery around the second cutting hole. The first cutting hole, the perforation and the second cutting hole are aligned with each other. The at least one first cutting hole periphery of the light-shading plate and the at least one second cutting hole periphery of the reflecting plate are made of a flexible material. A top surface of the at least one second cutting hole periphery is attached on a bottom surface of the first cutting hole periphery through the perforation.

In an embodiment, the luminous keyboard further includes a supporting plate, and the supporting plate is arranged between the membrane circuit board and the backlight module. The supporting plate includes plural fixing structures. The plural fixing structures of the supporting plate are connected with scissors-type connecting elements of the corresponding keys through corresponding openings of the membrane circuit board.

In an embodiment, the luminous keyboard further includes an operation element and a soft cable, and the operation element is fixed on the supporting plate. While the soft cable is penetrated upwardly through the second cutting hole of the reflecting plate, the perforation of the light guide plate and the first cutting hole of the light-shading plate, the at least one first cutting hole periphery and the at least one second cutting hole periphery are pushed up by the soft cable. Consequently, the soft cable is in communication with the operation element.

In an embodiment, the operation element is a joystick, and the soft cable is a serial advanced technology attachment (SATA) cable.

In an embodiment, the supporting plate further includes a position-limiting post, and the position-limiting post is protruded from a bottom surface of the supporting plate. While the position-limiting post is penetrated downwardly through the first cutting hole of the light-shading plate, the perforation of the light guide plate and the second cutting hole of the reflecting plate, the at least one first cutting hole periphery and the at least one second cutting hole periphery are pushed down by the position-limiting post.

In an embodiment, the backlight module further includes a light-emitting element, and the light-emitting element emits a light beam to the light guide plate.

In an embodiment, the at least one first cutting hole periphery and the at least one second cutting hole periphery are circumferentially attached on each other to block the light beam. Consequently, the light beam is not leaked out through the at least one first cutting hole periphery and the at least one second cutting hole periphery.

In an embodiment, a bottom surface of the at least one first cutting hole periphery is a flat surface. The second cutting hole periphery is a stepped structure. A portion of the at least one second cutting hole periphery is inserted into the perforation of the light guide plate and attached on the bottom surface of the at least one first cutting hole periphery.

In an embodiment, a diameter of the second cutting hole is larger than a diameter of the first cutting hole. A distal end of the at least one second cutting hole periphery does not completely cover a distal end of the at least one first cutting hole periphery.

In an embodiment, a top surface of the at least one second cutting hole periphery is a flat surface. The at least one first cutting hole periphery is a stepped structure. A portion of the at least one first cutting hole periphery is inserted into the at least one perforation and attached on the top surface of the at least one second cutting hole periphery.

In an embodiment, a diameter of the first cutting hole is larger than a diameter of the second cutting hole. A distal end of the at least one first cutting hole periphery does not completely cover a distal end of the at least one second cutting hole periphery.

In an embodiment, the first cutting hole and the second cutting hole are C-shaped, asterisk-shaped or I-shaped.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
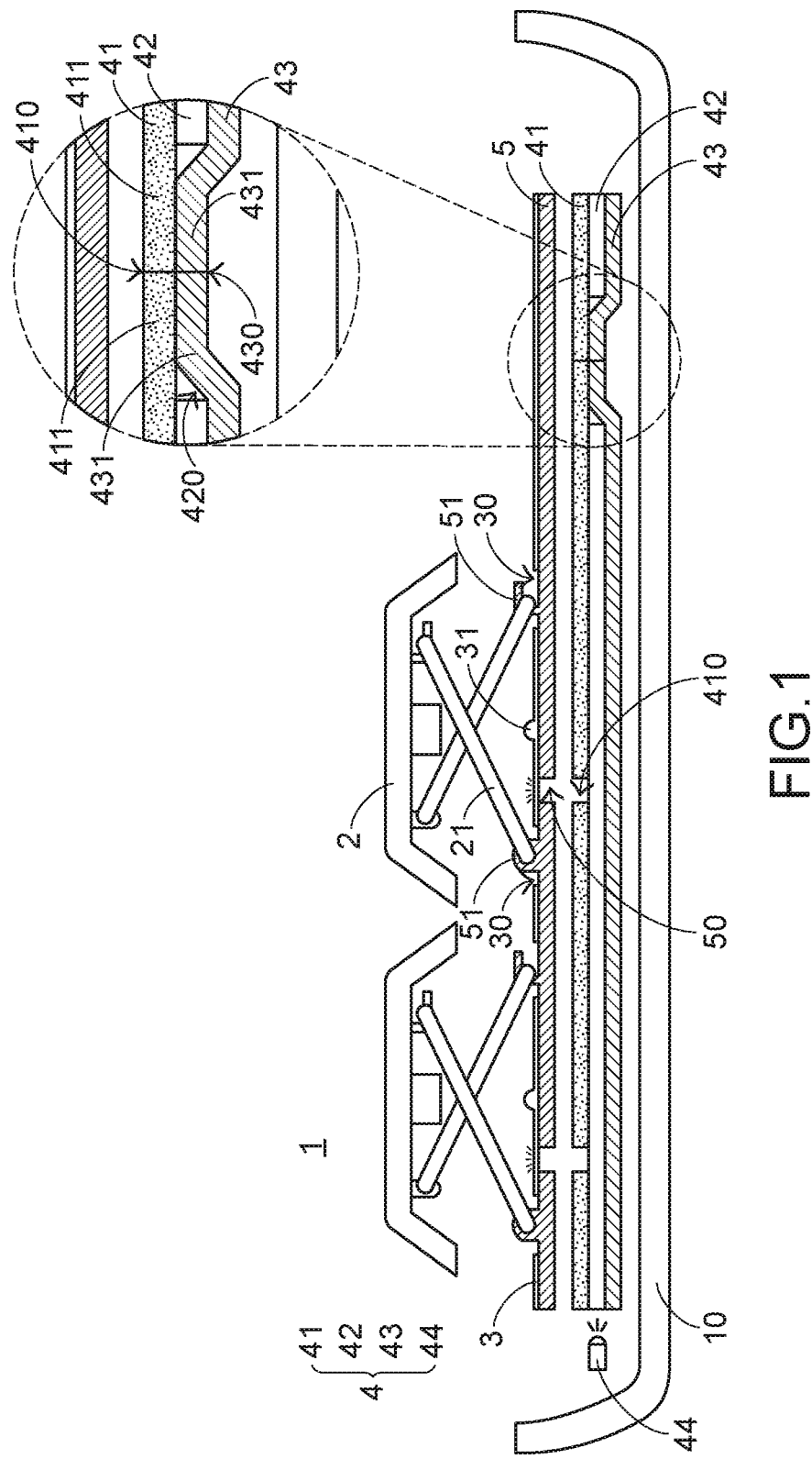
FIG. 1 is a schematic cross-sectional view illustrating a luminous keyboard according to a first embodiment of the present invention, in which a backlight module has not been penetrated.

FIG. 1 is a schematic cross-sectional view illustrating a luminous keyboard according to a first embodiment of the present invention, in which a backlight module has not been penetrated. The luminous keyboard 1 comprises plural keys 2, a membrane circuit board 3, a supporting plate 5 and a backlight module 4. The relative positions between these components are described as follows. The membrane circuit board 3 is stacked over the supporting plate 5. The key 2 is connected with the supporting plate 5 through an opening 30 of the membrane circuit board 3. The backlight module 4 is located under the supporting plate 5. That is, the membrane circuit board 3, the supporting plate 5 and the backlight module 4 are sequentially arranged from top to bottom.

Moreover, each key 2 comprises a scissors-type connecting element 21. The supporting plate 5 comprises plural fixing structures 51. The plural fixing structures 51 are connected with the scissors-type connecting elements 21 of the corresponding keys 2 through the corresponding openings 30 of the membrane circuit board 3. The membrane circuit board 3 further comprises plural electrical contacts 31. The electrical contacts 31 are formed on a top surface of the membrane circuit board 3. Moreover, one key 2 is aligned with a corresponding electrical contact 31. When the key 2 is pressed by a user, the corresponding electrical contact 31 is adapted to be triggered to generate an input signal.

The structure of the backlight module 4 will be described as follows. The backlight module 4 is located under the supporting plate 5. In an embodiment, the backlight module 4 comprises a light-shading plate 41, a light guide plate 42 and a reflecting plate 43. The light-shading plate 41, the light guide plate 42 and the reflecting plate 43 are sequentially stacked on each other from top to bottom. The light-shading plate 41 comprises a first cutting hole 410 and at least one first cutting hole periphery 411. The at least one first cutting hole periphery 411 is arranged around the first cutting hole 410. The reflecting plate 43 comprises a second cutting hole 430 and at least one second cutting hole periphery 431. The at least one second cutting hole periphery 431 is arranged around the second cutting hole 430. In this context, the cutting hole is also referred as a semi-cutting hole or a cable hole, whose aperture may be performed as a linear shape. The first cutting hole 410 is aligned with a perforation 420 of the light guide plate 42 and the second cutting hole 430 of the reflecting plate 43. Moreover, an object may be penetrated through the first cutting hole 410, the perforation 420 and the second cutting hole 430. Preferably but not exclusively, two first peripheries 411 are arranged around the first cutting hole 410, and two second peripheries 431 are arranged around the second cutting hole 430.

The backlight module 4 further comprises a light-emitting element 44. The light-emitting element 44 emits a light beam to the light guide plate 42. After the light beam is introduced into the light guide plate 42, the light beam is reflected by the reflecting plate 43 and transmitted through a first light-transmissible hole 40 of the light-shading plate 41 and a second light-transmissible hole 50 of the supporting plate 5 and outputted to the key 2. Consequently, the light beam is outputted from a bottom side of the luminous keyboard 1 to illuminate the keys 2. An example of the light-emitting element 44 is a side-view light emitting diode.

Moreover, the light-shading plate 41 and the reflecting plate 43 are made of a flexible material. In other words, the first cutting hole periphery 411 of the light-shading plate 41 and the second cutting hole periphery 431 of the reflecting plate 43 are flexible. When the second cutting hole periphery 431 is subjected to a flexural deformation, a top surface of the second cutting hole periphery 431 is inserted into the perforation 420 of the light guide plate 42 and attached on a bottom surface of the first cutting hole periphery 411. Preferably, the at least one first cutting hole periphery 411 and the at least one second cutting hole periphery 431 are circumferentially attached on each other. Since the light beam is completely blocked by the rim of the first cutting hole periphery 411 and the rim of the second cutting hole periphery 431, the light beam is not leaked out from the rim of the first cutting hole periphery 411 and the rim of the second cutting hole periphery 431. Under this circumstance, the light utilization is not reduced, and the undesired positions are not illuminated.

Figure 2:
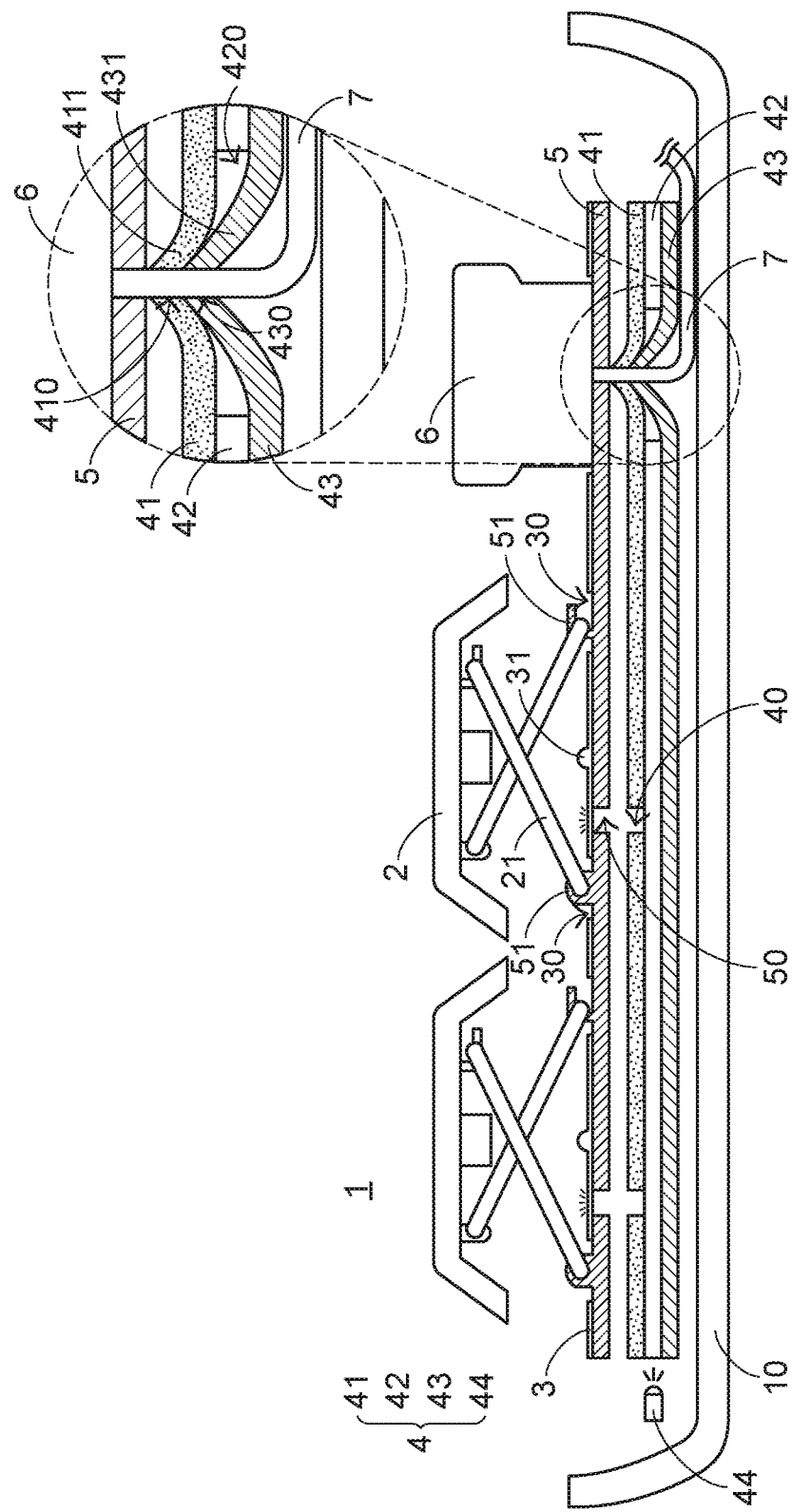
FIG. 2 is a schematic cross-sectional view illustrating a luminous keyboard according to the first embodiment of the present invention, in which the backlight module has been penetrated by a soft cable.

FIG. 2 is a schematic cross-sectional view illustrating a luminous keyboard according to the first embodiment of the present invention, in which the backlight module has been penetrated by a soft cable. The luminous keyboard 1 further comprises an operation element 6 and a soft cable 7. The soft cable 7 is in communication with the operation element 6. The operation signal generated by the operation element 6 is transferred through the soft cable 7. Moreover, the operation element 6 is fixed on the supporting plate 5. The soft cable 7 is penetrated upwardly through the second cutting hole 430 of the reflecting plate 43, the perforation 420 of the light guide plate 42 and the first cutting hole 410 of the light-shading plate 41, and connected with the operation element 6. While the soft cable 7 is penetrated upwardly through the second cutting hole 430, the perforation 420 and the first cutting hole 410, the at least one first cutting hole periphery 411 and the at least one second cutting hole periphery 431 are pushed up by the soft cable 7. Due to the attachment between the first cutting hole periphery 411 and the second cutting hole periphery 431 and the material thereof, the soft cable 7 is closely covered by the first cutting hole periphery 411 and the second cutting hole periphery 431 in response to the elastic restoring force of the first cutting hole periphery 411 and the second cutting hole periphery 431. That is, the outer surface of the soft cable 7 is covered by the first cutting hole periphery 411 and the second cutting hole periphery 431. Consequently, the light beam emitted by the backlight module 4 is not leaked out through the lateral sides of the soft cable 7.

Alternatively, the direction of penetrating the soft cable 7 may be changed. For example, the soft cable 7 is penetrated downwardly through the first cutting hole 410 of the light-shading plate 41, the perforation 420 of the light guide plate 42 and the second cutting hole 430 of the reflecting plate 43. In an embodiment, the operation element 6 is a joystick, and the soft cable 7 is a serial advanced technology attachment (SATA) cable. It is noted that the types of the operation element 6 and the soft cable 7 are not restricted.

Figure 3:
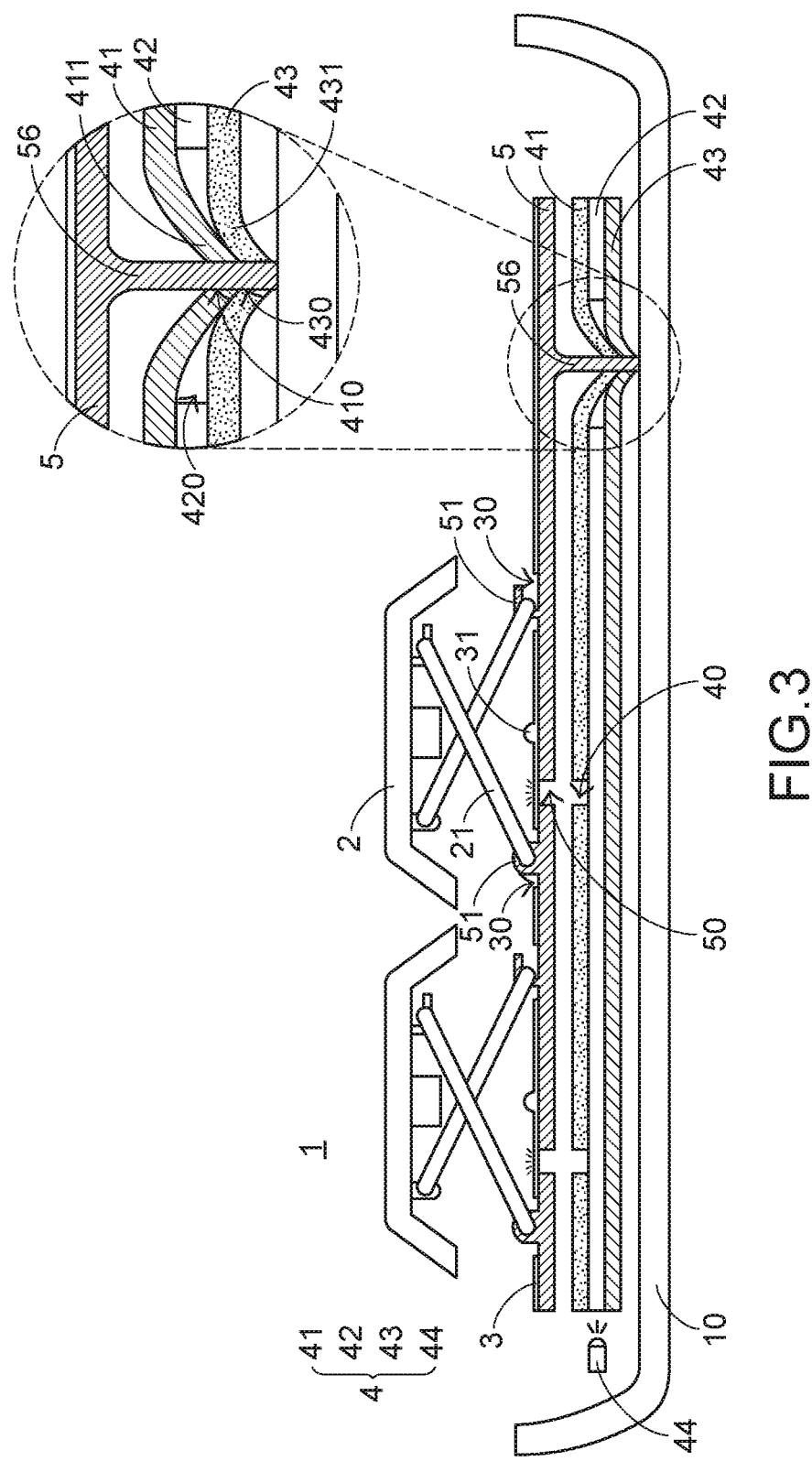
FIG. 3 is a schematic cross-sectional view illustrating a luminous keyboard according to the first embodiment of the present invention, in which the backlight module has been penetrated by a position-limiting post.

FIG. 3 is a schematic cross-sectional view illustrating a luminous keyboard according to the first embodiment of the present invention, in which the backlight module has been penetrated by a position-limiting post. In this embodiment, the supporting plate 5 of the luminous keyboard 1 further comprises a position-limiting post 56. The position-limiting post 56 is protruded from a bottom surface 55 of the supporting plate 5. The position-limiting post 56 is penetrated downwardly through the first cutting hole 410 of the light-shading plate 41, the perforation 420 of the light guide plate 42 and the second cutting hole 430 of the reflecting plate 43. In addition, the at least one first cutting hole periphery 411 and the at least one second cutting hole periphery 431 are pushed down by the position-limiting post 56. The position-limiting post 56 is connected with and fixed on a bottom case 10 of the luminous keyboard 1. Moreover, the position-limiting post 56 is capable of limiting the position of the backlight module 4. Consequently, the backlight module 4 is not moved in the horizontal direction.

Figure 4A:
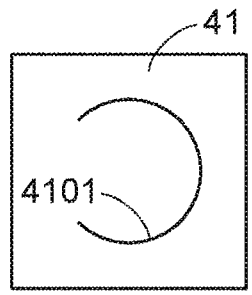
FIG. 4A is a schematic top view illustrating a first example of the first cutting hole of the luminous keyboard according to the first embodiment of the present invention, in which the first cutting hole is C-shaped.
Figure 4B:
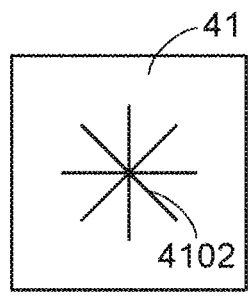
FIG. 4B is a schematic top view illustrating a second example of the first cutting hole of the luminous keyboard according to the first embodiment of the present invention, in which the first cutting hole is asterisk-shaped.
Figure 4C:
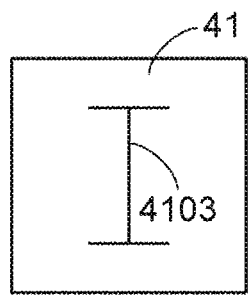
FIG. 4C is a schematic top view illustrating a third example of the first cutting hole of the luminous keyboard according to the first embodiment of the present invention, in which the first cutting hole is I-shaped.

FIG. 4A is a schematic top view illustrating a first example of the first cutting hole of the luminous keyboard according to the first embodiment of the present invention, in which the first cutting hole is C-shaped. As shown in FIG. 4A, the first cutting hole 4101 of the light-shading plate 41 is C-shaped. Preferably, the second cutting hole is also C-shaped. FIG. 4B is a schematic top view illustrating a second example of the first cutting hole of the luminous keyboard according to the first embodiment of the present invention, in which the first cutting hole is asterisk-shaped. As shown in FIG. 4B, the first cutting hole 4102 of the light-shading plate 41 is asterisk-shaped. Preferably, the second cutting hole is also asterisk-shaped. FIG. 4C is a schematic top view illustrating a third example of the first cutting hole of the luminous keyboard according to the first embodiment of the present invention, in which the first cutting hole is I-shaped. As shown in FIG. 4C, the first cutting hole 4103 of the light-shading plate 41 is I-shaped. Preferably, the second cutting hole is also I-shaped.

Figure 5:
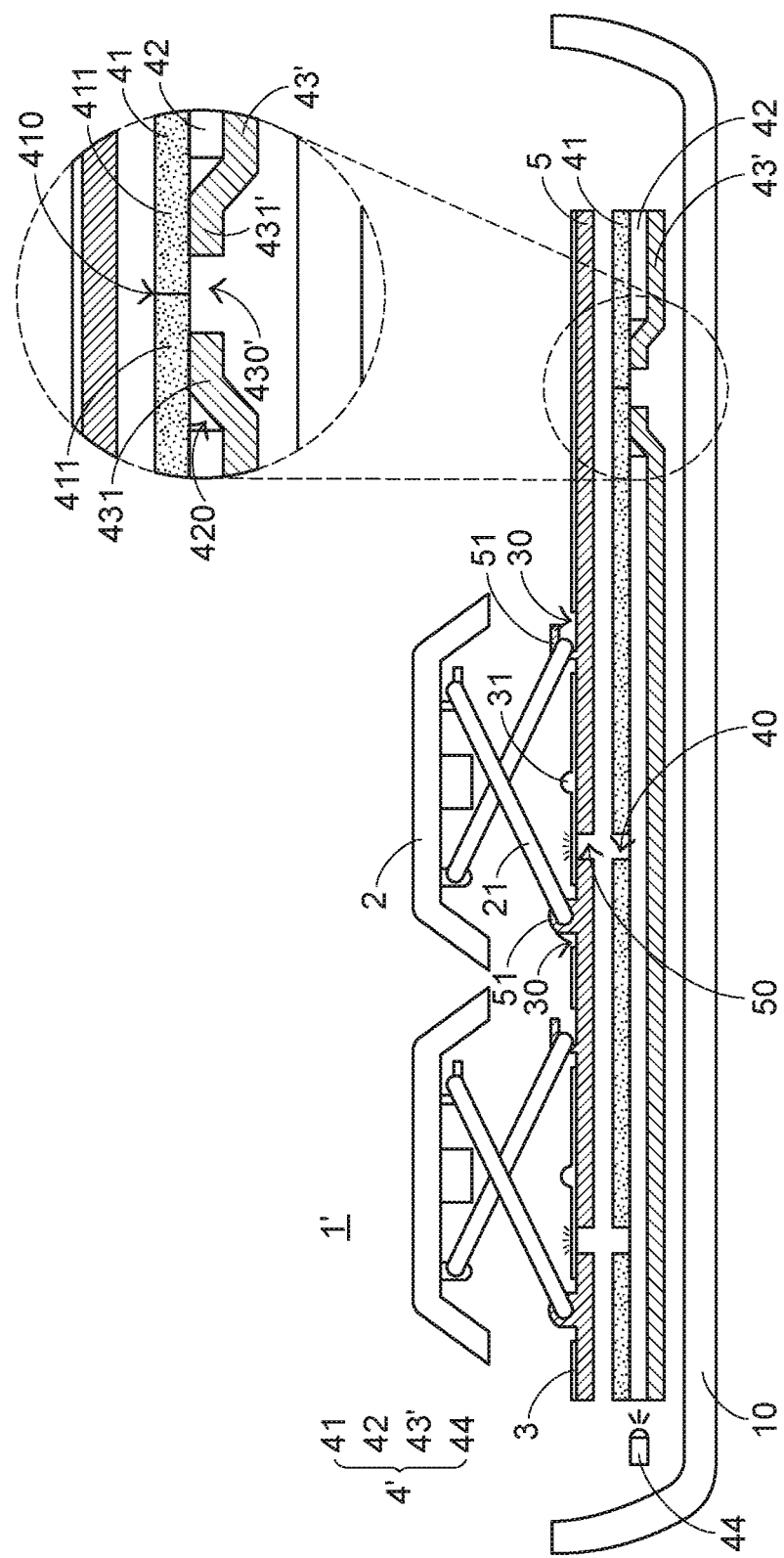
FIG. 5 is a schematic cross-sectional view illustrating a luminous keyboard according to a second embodiment of the present invention, in which a backlight module has not been penetrated.

FIG. 5 is a schematic cross-sectional view illustrating a luminous keyboard according to a second embodiment of the present invention, in which a backlight module has not been penetrated. The components of the second embodiment are similar to those of the first embodiment. In this embodiment, the luminous keyboard 1' comprises plural keys 2, a membrane circuit board 3, a supporting plate 5 and a backlight module 4'. The backlight module 4' comprises a light-shading plate 41, a light guide plate 42 and a reflecting plate 43'. The light-shading plate 41, the light guide plate 42 and the reflecting plate 43' are sequentially stacked on each other from top to bottom. In the backlight module 4', a bottom surface of the first cutting hole periphery 411 of the light-shading plate 41 is a flat surface. Moreover, the second cutting hole periphery 431' is a stepped structure. A portion of the second cutting hole periphery 431' is inserted into the perforation 420 of the light guide plate 42 and attached on the bottom surface of the first cutting hole periphery 411. The diameter of the second cutting hole 430 is larger than the diameter of the first cutting hole 410. In other words, the distal end of the second cutting hole periphery 431' does not completely covering the distal end of the first cutting hole periphery 411.

Figure 6:
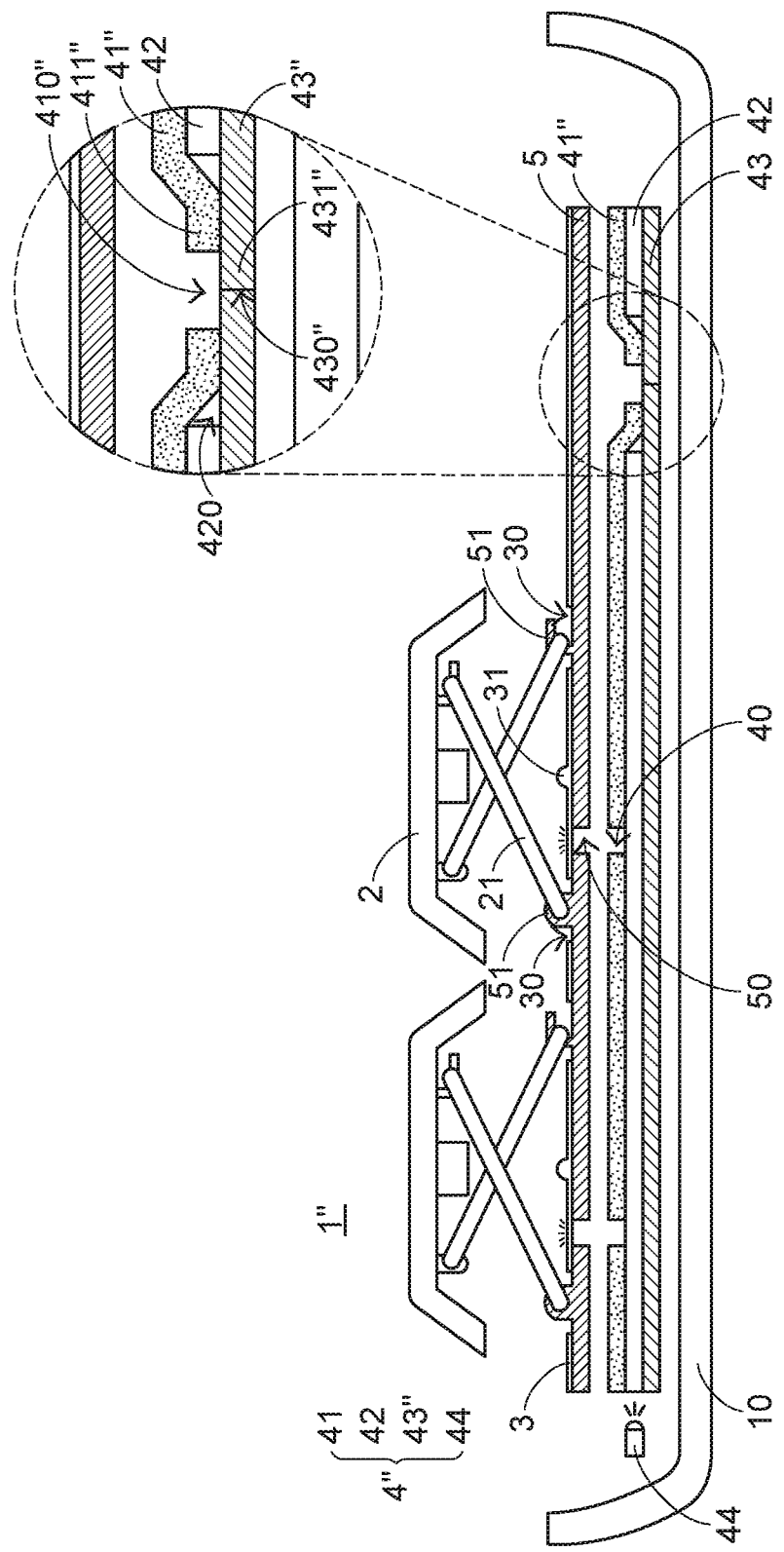
FIG. 6 is a schematic cross-sectional view illustrating a luminous keyboard according to a third embodiment of the present invention, in which a backlight module has not been penetrated.

FIG. 6 is a schematic cross-sectional view illustrating a luminous keyboard according to a third embodiment of the present invention, in which a backlight module has not been penetrated. The components of the second embodiment are similar to those of the first embodiment. In this embodiment, the luminous keyboard 1" comprises plural keys 2, a membrane circuit board 3, a supporting plate 5 and a backlight module 4". The backlight module 4" comprises a light-shading plate 41", a light guide plate 42 and a reflecting plate 43". The light-shading plate 41", the light guide plate 42 and the reflecting plate 43" are sequentially stacked on each other from top to bottom. In the backlight module 4', a top surface of the second cutting hole periphery 431" is a flat surface. Moreover, the first cutting hole periphery 411" is a stepped structure. A portion of the first cutting hole periphery 411" is inserted into the perforation 420 of the light guide plate 42 and attached on the top surface of the second cutting hole periphery 431". The diameter of the first cutting hole 410" is larger than the diameter of the second cutting hole 430". In other words, the distal end of the first cutting hole periphery 411" does not completely cover the distal end of the second cutting hole periphery 431".

From the above descriptions, the present invention provides the luminous keyboard. The backlight module is made of the flexible material. A cutting hole is formed in the backlight module for allowing an object to pass through. In response to the elastic restoring force of the backlight module, the outer surface of the object is closely covered. Due to this arrangement, the light beam generated by the backlight module is not leaked out from the lateral side of the object. Consequently, the light utilization is not reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:
1. A luminous keyboard, comprising:
   plural keys;
   a membrane circuit board located under the plural keys, and comprising plural electrical contacts, wherein the plural keys are aligned with the plural electrical contacts, respectively, wherein when one of the plural keys is pressed by a user, the corresponding electrical contact is triggered;
   a backlight module located under the membrane circuit board, and comprising a light-shading plate, a light guide plate and a reflecting plate, wherein the light-shading plate, the light guide plate and the reflecting plate are sequentially stacked on each other from top to bottom, the light-shading plate comprises a first cutting hole and at least one first cutting hole periphery around the first cutting hole, the light guide plate comprises a perforation, the reflecting plate comprises a second cutting hole and at least one second cutting hole periphery around the second cutting hole, and the first cutting hole, the perforation and the second cutting hole are aligned with each other, wherein the at least one first cutting hole periphery of the light-shading plate and the at least one second cutting hole periphery of the reflecting plate are made of a flexible material, and a top surface of the at least one second cutting hole periphery is attached on a bottom surface of the first cutting hole periphery through the perforation;
   a supporting plate, and the supporting plate is arranged between the membrane circuit board and the backlight module, wherein the supporting plate includes plural fixing structures, and the plural fixing structures of the supporting plate are connected with scissors-type connecting elements of the corresponding keys through corresponding openings of the membrane circuit board; and
   an operation element and a soft cable, and the operation element is fixed on the supporting plate, wherein while the soft cable is penetrated upwardly through the second cutting hole of the reflecting plate, the perforation of the light guide plate and the first cutting hole of the light-shading plate, the at least one first cutting hole periphery and the at least one second cutting hole periphery are pushed up by the soft cable, so that the soft cable is in communication with the operation element.

2. The luminous keyboard according to claim 1, wherein the operation element is a joystick, and the soft cable is a serial advanced technology attachment (SATA) cable.

3. The luminous keyboard according to claim 1, wherein the supporting plate further comprises a position-limiting post, and the position-limiting post is protruded from a bottom surface of the supporting plate, wherein while the position-limiting post is penetrated downwardly through the first cutting hole of the light-shading plate, the perforation of the light guide plate and the second cutting hole of the reflecting plate, the at least one first cutting hole periphery and the at least one second cutting hole periphery are pushed down by the position-limiting post.

4. The luminous keyboard according to claim 1, wherein the backlight module further comprises a light-emitting element, and the light-emitting element emits a light beam to the light guide plate.

5. The luminous keyboard according to claim 4, wherein the at least one first cutting hole periphery and the at least one second cutting hole periphery are circumferentially attached on each other to block the light beam, so that the light beam is not leaked out through the at least one first cutting hole periphery and the at least one second cutting hole periphery.

6. The luminous keyboard according to claim 1, wherein a bottom surface of the at least one first cutting hole periphery is a flat surface, the second cutting hole periphery is a stepped structure, and a portion of the at least one second cutting hole periphery is inserted into the perforation of the light guide plate and attached on the bottom surface of the at least one first cutting hole periphery.

7. The luminous keyboard according to claim 6, wherein a diameter of the second cutting hole is larger than a diameter of the first cutting hole, and a distal end of the at least one second cutting hole periphery does not completely covering a distal end of the at least one first cutting hole periphery.

8. The luminous keyboard according to claim 1, wherein a top surface of the at least one second cutting hole periphery is a flat surface, the at least one first cutting hole periphery is a stepped structure, and a portion of the at least one first cutting hole periphery is inserted into the at least one perforation and attached on the top surface of the at least one second cutting hole periphery.

9. The luminous keyboard according to claim 8, wherein a diameter of the first cutting hole is larger than a diameter of the second cutting hole, and a distal end of the at least one first cutting hole periphery does not completely covering a distal end of the at least one second cutting hole periphery.

10. The luminous keyboard according to claim 1, wherein the first cutting hole and the second cutting hole are C-shaped, asterisk-shaped or I-shaped.

11. A luminous keyboard, comprising:
    plural keys;
    a membrane circuit board located under the plural keys, and comprising plural electrical contacts, wherein the plural keys are aligned with the plural electrical contacts, respectively, wherein when one of the plural keys is pressed by a user, the corresponding electrical contact is triggered;
    a backlight module located under the membrane circuit board, and comprising a light-shading plate, a light guide plate and a reflecting plate, wherein the light-shading plate, the light guide plate and the reflecting plate are sequentially stacked on each other from top to bottom, the light-shading plate comprises a first cutting hole and at least one first cutting hole periphery around the first cutting hole, the light guide plate comprises a perforation, the reflecting plate comprises a second cutting hole and at least one second cutting hole periphery around the second cutting hole, and the first cutting hole, the perforation and the second cutting hole are aligned with each other, wherein the at least one first cutting hole periphery of the light-shading plate and the at least one second cutting hole periphery of the reflecting plate are made of a flexible material, and a top surface of the at least one second cutting hole periphery is attached on a bottom surface of the first cutting hole periphery through the perforation; and
    a supporting plate, and the supporting plate is arranged between the membrane circuit board and the backlight module, wherein the supporting plate includes plural fixing structures, and the plural fixing structures of the supporting plate are connected with scissors-type connecting elements of the corresponding keys through corresponding openings of the membrane circuit board, wherein the supporting plate further comprises a position-limiting post, and the position-limiting post is protruded from a bottom surface of the supporting plate, wherein while the position-limiting post is penetrated downwardly through the first cutting hole of the light-shading plate, the perforation of the light guide plate and the second cutting hole of the reflecting plate, the at least one first cutting hole periphery and the at least one second cutting hole periphery are pushed down by the position-limiting post.

12. The luminous keyboard according to claim 11, wherein the backlight module further comprises a light-emitting element, and the light-emitting element emits a light beam to the light guide plate.

13. The luminous keyboard according to claim 12, wherein the at least one first cutting hole periphery and the at least one second cutting hole periphery are circumferentially attached on each other to block the light beam, so that the light beam is not leaked out through the at least one first cutting hole periphery and the at least one second cutting hole periphery.

14. The luminous keyboard according to claim 11, wherein a bottom surface of the at least one first cutting hole periphery is a flat surface, the second cutting hole periphery is a stepped structure, and a portion of the at least one second cutting hole periphery is inserted into the perforation of the light guide plate and attached on the bottom surface of the at least one first cutting hole periphery.

15. The luminous keyboard according to claim 14, wherein a diameter of the second cutting hole is larger than a diameter of the first cutting hole, and a distal end of the at least one second cutting hole periphery does not completely covering a distal end of the at least one first cutting hole periphery.

16. The luminous keyboard according to claim 11, wherein a top surface of the at least one second cutting hole periphery is a flat surface, the at least one first cutting hole periphery is a stepped structure, and a portion of the at least one first cutting hole periphery is inserted into the at least one perforation and attached on the top surface of the at least one second cutting hole periphery.

17. The luminous keyboard according to claim 16, wherein a diameter of the first cutting hole is larger than a diameter of the second cutting hole, and a distal end of the at least one first cutting hole periphery does not completely covering a distal end of the at least one second cutting hole periphery.

18. The luminous keyboard according to claim 11, wherein the first cutting hole and the second cutting hole are C-shaped, asterisk-shaped or I-shaped.

* * * * *